United States Patent [19]
Ishizawa et al.

[11] Patent Number: 4,783,740
[45] Date of Patent: Nov. 8, 1988

[54] INVENTORY MANAGEMENT SYSTEM

[75] Inventors: Toshimichi Ishizawa, Kawasaki; Ryuichi Nakagawa, Yokohama; Youji Yamaguchi, Tokyo; Takashi Kobayashi; Yoshihisa Toyoda, both of Yokohama; Nobuya Nishida, Sagamihara; Yoshitaka Naya, Tokyo; Hiroshi Araki; Isao Adachi, both of Yokohama; Akimichi Ishikawa, Tokyo; Eiji Ootaki, Choufu; Masayuki Nagatsuka, Sagamihara, all of Japan

[73] Assignees: Kabushiki Kaisha Toshiba, Kawasaki; Yamato Electric Industry Co., Ltd., Yokohama, both of Japan

[21] Appl. No.: 946,045

[22] Filed: Dec. 24, 1986

[30] Foreign Application Priority Data

Dec. 26, 1985 [JP] Japan .................................. 60-293996

[51] Int. Cl.$^4$ ............................................. G06F 15/24
[52] U.S. Cl. .................................... 364/403; 235/385; 364/478

[58] Field of Search ................ 364/403, 478, 200 MS, 364/900 MS; 235/385

[56] References Cited

U.S. PATENT DOCUMENTS

| 4,336,589 | 6/1982 | Smith et al. | 364/403 |
| 4,459,663 | 7/1981 | Dye | 364/403 |
| 4,542,808 | 9/1985 | Lloyd, Jr. et al. | 364/478 |

Primary Examiner—Jerry Smith
Assistant Examiner—Allen MacDonald
Attorney, Agent, or Firm—Cushman, Darby & Cushman

[57] ABSTRACT

The inventory management system comprises a central control unit, a number of parts terminal units deposed at each parts container, and some guide terminal units arranged at each parts container shelf. A worker goes to a parts container in accordance with the guidance on the guide terminal units, performs parts storing, parts collecting or stocktaking jobs in accordance with a job display and parts quantity display on the parts terminal unit and can also correct a displayed parts quantity if the quantity displayed is not correct.

19 Claims, 7 Drawing Sheets

INVENTORY MANAGEMENT SYSTEM

BACKGROUND OF THE INVENTION

1. Field of the Invention

The present invention relates to an inventory management system for managing inventory jobs such as parts storing job, parts collecting jobs and stocktaking jobs.

2. Description of the Prior Art

An electric appliance, for instance, is made up of a great number of parts. To assemble these appliances, various parts are previously stored in a storehouse, collected by an inventory worker according to necessity, and then conveyed to a workshop at which the appliances are to be assembled. The conventional method of storing or collecting necessary parts will be described hereinbelow.

In a parts management section, various parts to be stored in a storehouse are usually managed in dependence upon documents referred to as slips. On each slip the kind, the name (code), the number, the weight and the standard of parts are entered. When parts are stored or collected, a shelf on which desired parts are in stock is first searched on the basis of the slip and worker's perception, and then the parts are put in or taken out of a parts container (e.g. box, drawer, etc.) arranged in the searched shelf. Further, after the parts have been stored or collected, the results of the storage or collection are entered in an inventory book.

The above-mentioned parts storing or collecting jobs, there often exists a difference between the number of parts written on the slip and the number actually stored in the container. Therefore, the correct number of parts should be entered on the slip whenever inventory jobs have been completed.

In the above-mentioned conventional parts management method, since the inventory worker checks various parts described on slips (handed over by a person of a management section) and searches the shelves on which the parts are stored, it can takes many hours for a worker having a poor experience to search the shelf and the containers or drawers. Therefore, in case where a single worker cannot collect various parts within a predetermined time, many workers work on the inventory job at the same time. In this case, although each worker engages with the inventory job as instructed a previously determined way of job, it is difficult to determine how the inventory jobs can be accomplished in the shortest possible time, for instance, which worker should take charge of which parts. In addition, when the parts storing job and the parts collecting job are both performed simultaneously, specific parts are subject to interference with each other in both the storing and collecting processes, so that the number of parts in stock vary and thus it is impossible to accurately determine the number of parts stored in a container.

Furthermore, when the worker finds a drawer in which the desired parts are in stock, since all the inventory data should be confirmed by the worker, such as the number of parts previously stored, the number of parts now stored, and the resulting number of parts stored in total, many hours are required for this inventory information confirmation job and more time is consumed for the parts number confirmation job than for the essential parts storing and collecting job.

In summary, the conventional inventory management method has the following drawbacks:

(1) Since the job is performed on the basis of slips, the efficiency is not high and errors inevitably occur.

(2) It takes a long time to find a container position at which target parts are in stock.

(3) Another job is required to confirm the number of parts or to correct the inventory book.

SUMMARY OF THE INVENTION

With these problems in mind, therefore, it is the primary object of the present invention to provide an inventory management system in which even workers having poor experience can perform inventory jobs easily, quickly, and accurately.

To achieve the above-mentioned object, the inventory management system according to the present invention includes the following elements.

A central control unit has a master file means for storing parts inventory information and a job file means for storing inventory job information. A plurality of terminal unit means are arranged for each parts storing container and provided with job information display means for displaying inventory job information related to the parts stored in the container on the basis of inventory job information recorded in the job file means, and parts inventory information updating means updating parts inventory information recorded in the master file means on the basis of actual inventory job.

The parts inventory information is a parts name or code, a quantity of parts now in stock, etc. The inventory job information is the kind of job (storing, collecting and stocktaking), a quantity of parts to be stored, collected or checked, etc.

The job information displaying means are lamps for indicating the kind of jobs, and a digital display unit for indicating a parts quantity related to the displayed job. The parts inventory information updating means are two digit position shifting and digit changing buttons for correcting the display quantity where necessary and an end button for updating a quantity recorded in the master file on the basis of a corrected parts quantity.

The job information displaying means further comprises a job/operator number indicator for allowing an operator to select one of many jobs or his own when a number is selected by a selector button and a sub-section display for indicating the number of subsections further partitioned within a container.

In addition, it is convenient to further arrange some guide terminal units for guiding workers to container position, about subsection position, along job route, etc.

In use, a worker goes to a parts container in accordance with the guidance on the guide terminal units to store, collect or check parts in accordance with instructions from the job information displaying means (job indication lamp and parts quantity). It is also possible to correct a displayed quantity when necessary using the the updating means (end switch) to update the unventory data recorded in the master file.

BRIEF DESCRIPTION OF THE DRAWINGS

The features and advantages of the inventor management system according to the present invention will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

Figure 1:
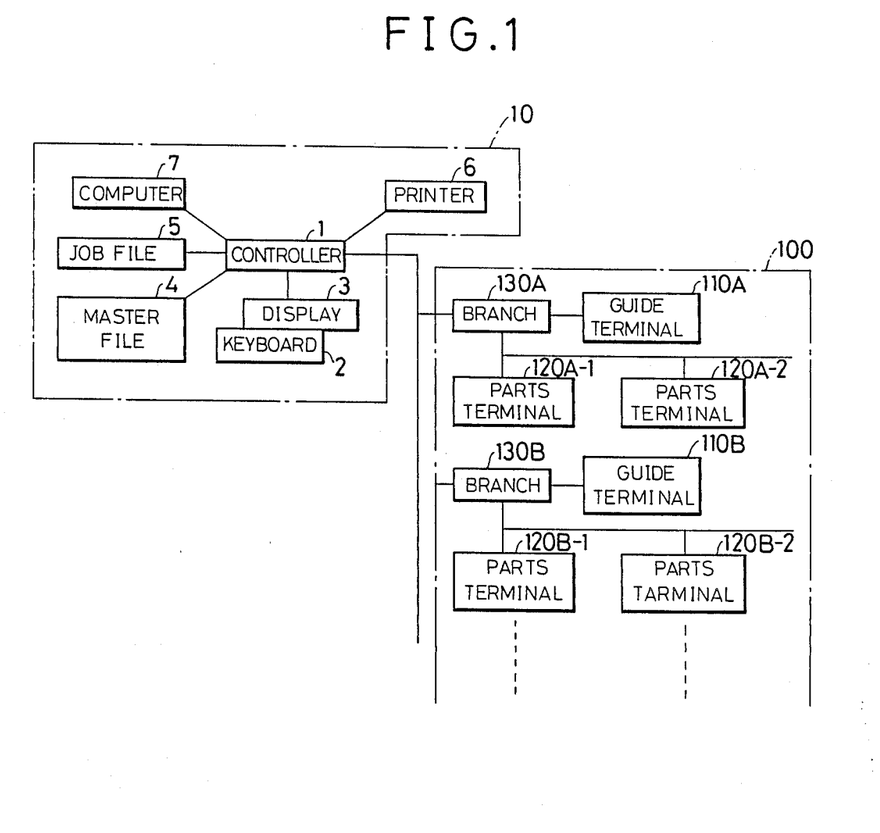
FIG. 1 is a schematic block diagram of the inventory management system according to the present invention.

With reference to the attached drawings, embodiments of the present invention will be described hereinbelow. FIG. 1 is a schematic block diagram of the inventory management system according to the present invention, which roughly comprises a central control unit 10 and a terminal unit group 100.

In the drawing, the central control unit 10 comprises a controller (CPU) 1, a keyboard 2, a display unit (CRT) 3, a master file 4, a job file 5, a printer 6, and another computer 7 where necessary.

The terminal unit group 100 includes a plurality of guide terminal units 110A, 110B, . . . , parts terminal units 120A-1, 120A-2, . . . , 120B-1, 120B-2, and branch devices 130A, 130B, . . . , as depicted in FIG. 1.

Figure 2:
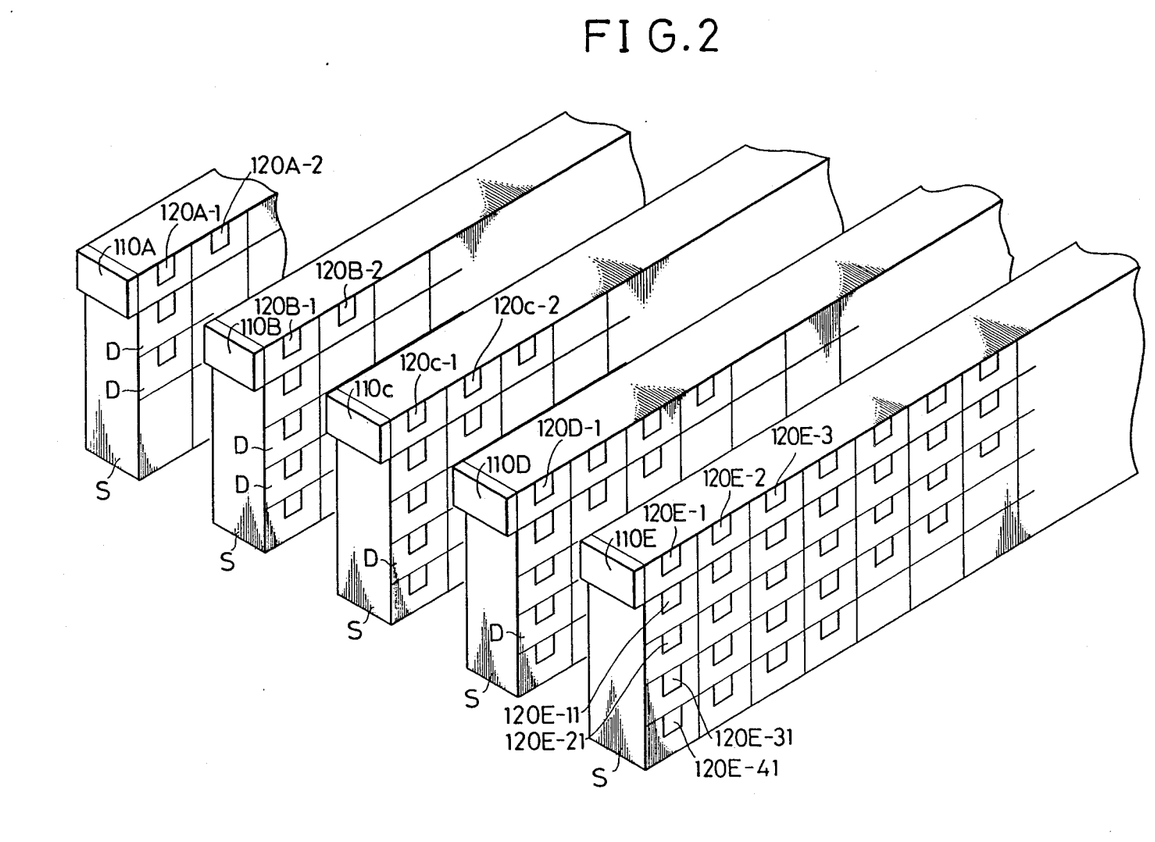
FIG. 2 is a perspective illustration showing an example of a storehouse, in which shelves, drawers (containers), parts terminal units, and guide terminal units are arranged or provided in order.

The central control unit 10 is equipped in an appropriate position other than a storehouse and operated by specified central operators. The guide terminals devices 110A, 110B . . . are arranged for each shelf S, for instance, in a storehouse, and the parts terminal units 120A-1, 120A-2, . . . , 120B-1, 120B-2, . . . are arranged for each parts drawer or container D, for instance, of a shelf, as depicted in FIG. 2.

The control unit 10 will be described in further detail. The keyboard 2 is used to entering various inventory or job information. The display unit 3 displays various information where necessary. The job file 5 records inventory job information (such as the kinds of jobs such as parts storing, parts collecting, and stocktaking), a quantity of parts to be stored, collected or checked, the job/operator numbers, etc. before some inventory jobs are performed. The master file 4 records essential parts inventory information such as parts name or code, a quantity of parts now in stock, etc. which serves as an inventory book.

The parts terminal unit 120 will be described in further detail with reference to FIGS. 2-6. As shown in FIG. 2 parts terminal unit 120 is arranged for each drawer D in which parts are stored, of shelves S arranged within a storehouse. Between two arranged-shelves S, there exists a space through which a worker can pass together with a carriage (bogie) to store or collect parts into or from the drawer D arranged in the shelf S.

Figure 3:
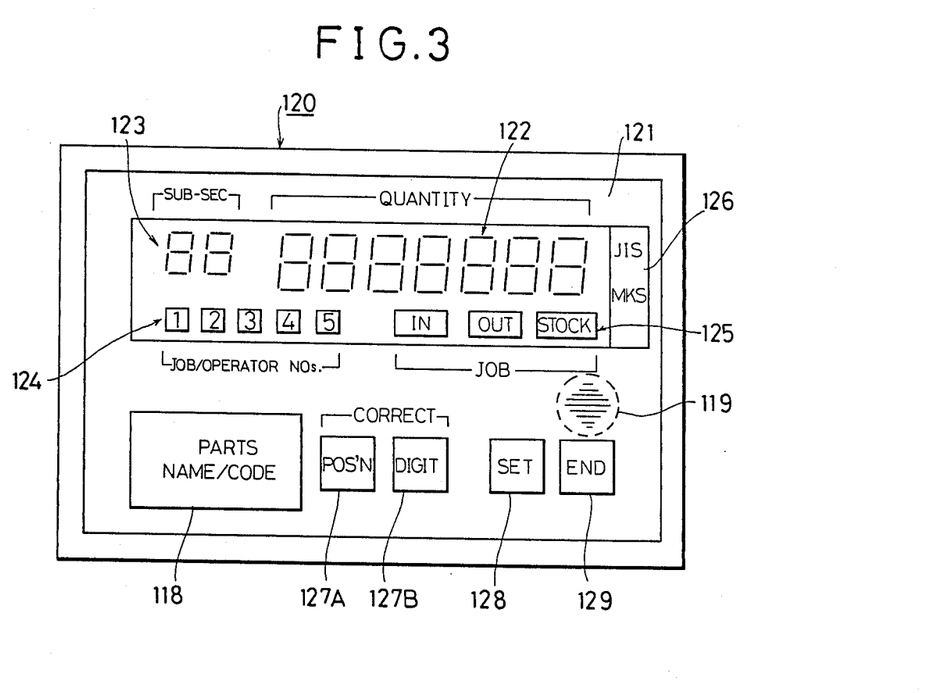
FIG. 3 is a front view showing a first embodiment of the parts terminal unit according to the present invention.

FIG. 3 shows a first embodiment of the parts terminal unit 120 with a panel surface 121 including a display section and a data updating section. The display section includes a parts quantity display section 122, a subsection number display section 123, a job/operator number display section 124, and a job display section 125. The data updating section includes a quantity correct button made up of a digit position shifting button 127A and a digit changing button 127B, a selector button 128 for selecting any one of the job/operator numbers 124, and an end button 129 depressed when a predetermined job has been completed. Further, in FIG. 3, the numeral 118 denotes a panel on which a parts name or code to be store is written; the numeral 126 denotes a unit/standard display section 126 on which a unit (MKS) or a standard (JIS) is written; the numeral 119 denotes a buzzer for informing a worker of an abnormal state where necessary.

The parts quantity display section 122 indicates the number of parts to be stored, collected or checked by a worker, which is designated by a control operator from the control unit 10. However, the displayed number can freely be corrected by the worker by the use of the two correct buttons 127A and 127B in order to indicate a correct number of parts actually stored, collected or checked. When the worker depressed the end button 129, the quantity corrected by the worker and now displayed is sent to the control unit to update the value of the master file 4.

The job display section 125 is made up of a parts storing job indication lamp IN, a parts collecting job indication lamp OUT and a stocktaking indication lamp STOCK.

The subsection number display section 123 indicates the number of subsections partitioned by parting strips, for instance, within a single drawer D. When a digit is lit up in this display section 123, this indicates that job should be achieved for a sub-section container (or a parts box) thus indicated.

The job/operator number display section 124 indicates the number of jobs or the number of operators (workers) when many jobs are to be performed in sequence in the same drawer by a single worker or plural jobs are to be performed in the same drawer by many workers at different times.

If three lamps come on, this indicates that three different workers are to perform some jobs separately or that three different jobs are to be performed by a single worker separately in this drawer. When a worker who knows his own designated number depresses the selector button 128 continually so that a lamp corresponding to his own number blinks, the job for this worker is selected at this drawer. When the worker who previously knows he has many jobs depresses the selector button 128 continually so that a lamp corresponding to the succeeding job blinks, the succeeding job for this worker is selected at this drawer. Further, whenever selector button 128 is depressed, the blinking lamp is shifted one by one in the rightward direction. For instance, when one of the operations or jobs is selected at the parts container, the kind of jobs (parts storage, parts collection, stocktaking) is indicated on the job display section 125 by lighting up a lamp corresponding thereto, and the number of parts to be stored, collected or confirmed is indicated by the parts quantity display section 112.

During the job, if the worker finds that the displayed parts quantity is not correct, he can correct the displayed quantity by using the correction buttons 127A and 127B. That is, when the digit position shifting button 127A is depressed, a digit blinks and shifts in the leftward direction so that a position of digit to be corrected can be selected. Under these conditions, when the digit change button 127B is depressed, a digit at the selected digit position is incremented or decremented from 0 to 9 or vice versa in sequence.

When the confirmed number of parts is correctly indicated on the parts quantity display section 122, the worker depresses the end (confirmation) button 129 to transfer the corrected data now displayed on the display section 122 to the control unit 10. When this end button 129 is depressed, inventory information recorded in the master file 4 is updated and recorded as new information whenever an inventory job has been completed.

Further, in the unit/standard display section 126, a parts standard name (e.g. JIS) or a unit (e.g. MKS) are written. This section 126 is made of a paper on which a unit or a standard can be written with a pencil, for instance.

In the above embodiment, the display sections can be formed by a liquid crystal display, light-emitted diodes, a fluorescent tube, a plasma display, etc. The buttons can be momentary switches, touch switches, etc. The data can be transferred between the central control unit 10 and the terminal unit group 100 through light, sound waves, radio waves, lasers, etc. without being limited to cables.

Figure 4:
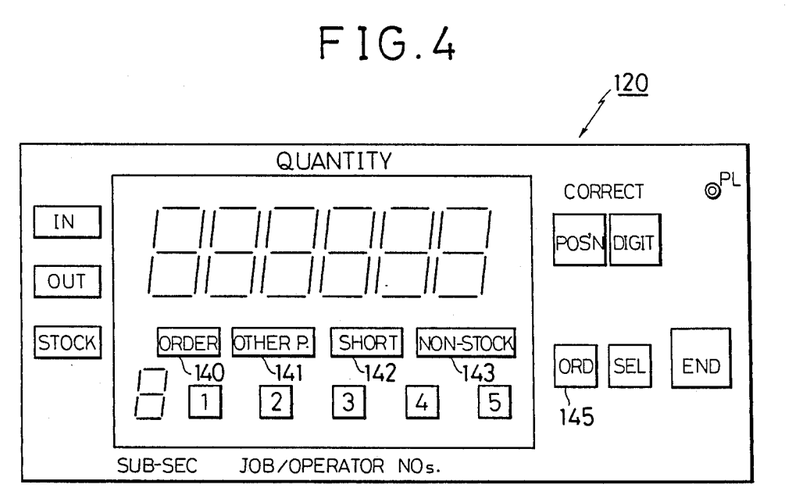
FIG. 4 is a front view showing a second embodiment of the parts terminal unit according to the present invention.

FIG. 4 shows a second embodiment of the parts terminal unit 120, in which additional display sections are provided. An order display lamp 140 ORDER indicates that the number of parts now in stock is less than a predetermined number and therefore this parts have already been ordered. An other position display lamp 141 OTHER P. indicates that the parts are stored at another position for some reason or other. A stock shortage display lamp 142 SHORT indicates that the number of stored parts is short or insufficient. A parts non-stock display lamp 143 NON-STOCK indicates that the parts have already been ordered and accepted but not yet been stored. In dependence upon these additional information entered through the control unit 10 the worker knows the present status more clearly. Further, when only the stock shortage lamp 142 is lit up, the worker depresses an order button 145 ORD to send the stock shortage situation to the central control unit 10 to urge the order of the parts.

Figure 5:
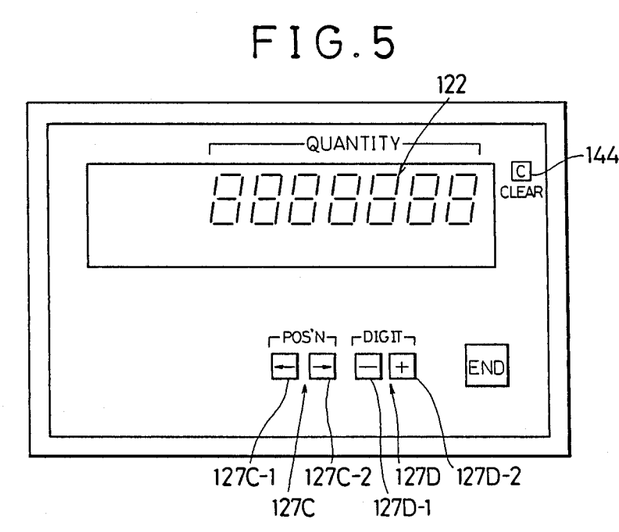
FIG. 5 is a front view showing a modification of the parts terminal unit shown in FIG. 4.

FIG. 5 shows a modification of the parts terminal unit 120, in which two digit position shifting buttons 127C-1, 127C-2 are provided in place of a push button 127A shown in FIG. 3 and two digit changing buttons 127D-1, 127D-2 are provided in place of a push button 127B shown in FIG. 3. When either of the buttons 127C-1 or -2 is kept depressed, the digit position shifts in one direction corresponding to the indicated arrow. When either of the buttons 127D-1 or -2 is kept depressed, the digit is incremented or decremented one by one according to the positive or negative mark. Further, when a clear button 144 is depressed, the numerical value on the display section 122 is cleared to "0 0 0 0 0 0 0".

Figure 6:
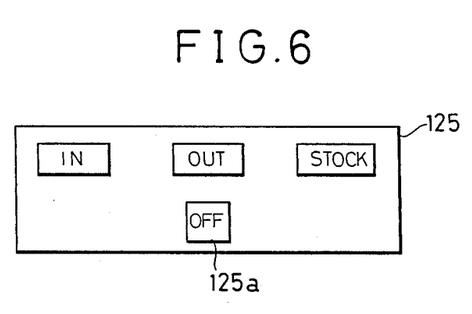
FIG. 6 is a front view showing a modification of the job display section of the parts terminal unit.

FIG. 6 shows another modification of the parts terminal unit 120, in which an additional off switch 125a is provided in the job display section 125. A plurality of these switches 125a of plural parts terminal units 120 arranged in a shelf are connected in parallel to each other, and connected in series to an indicator lamp mounted on the shelf. Therefore, if the worker depresses this switch 125a after having completed his job related to the terminal unit 120 arranged on the shelf having the indicator lamp, when all the jobs related to the shelf have been completed, the lamp on the shelf goes off, indicating that no job remains in the corresponding shelf. By doing this, it is possible to prevent the workers from forgetting the remaining jobs related to the shelf.

Figure 7:
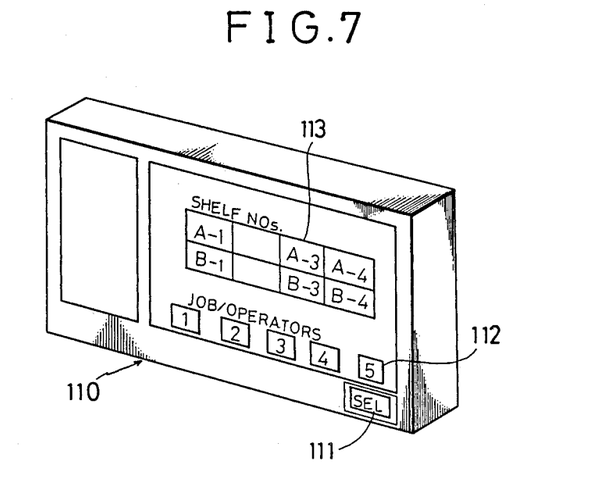
FIG. 7 is a perspective view of a first embodiment of a guide terminal unit according to the present invention.

FIG. 7 shows a first embodiment of the guide terminal unit 110 which is arranged for each shelf group or on both the sides of each shelf group. When a worker finds that a lamp corresponding his own number is on, he depresses a selector button 111 to blink his own job/operator number lamp 112 so that the shelves related to his jobs are indicated on a shelf position display section 113. Therefore, the worker can know the positions of shelves at which he should work.

Figure 8:
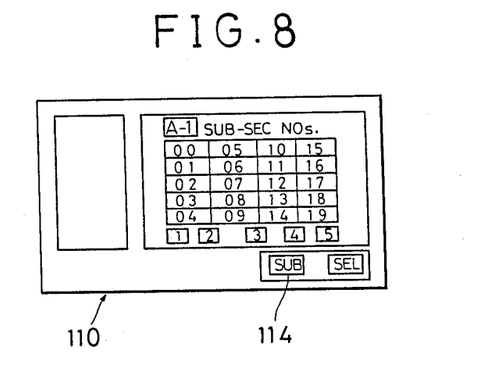
FIG. 8 is a front view showing a second embodiment of the guide terminal unit.

FIG. 8 shows a second embodiment of the guide terminal unit 110, in which a subsection button 114 is further provided to switch the shelf display shown in FIG. 7 to the subsection display shown in FIG. 8 or vice versa. After a worker knows the position of a shelf related to his job, he depresses this button 114 to further know the positions of subsections related to his jobs at the shelf.

Figure 9:
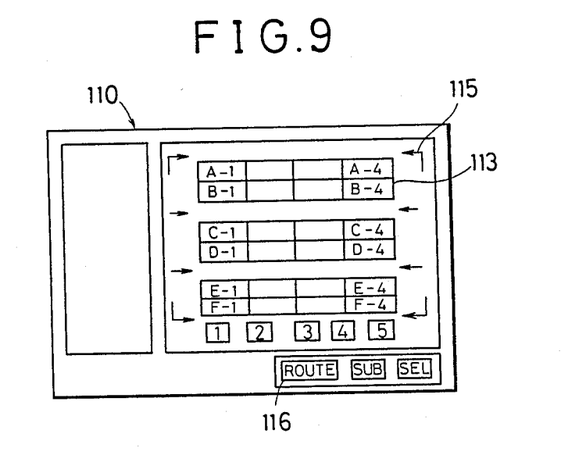
FIG. 9 is a front view showing a third embodiment of the guide terminal unit.

FIG. 9 shows a third modification of the guide terminal unit 110, in which a route of the worker is further indicated on the display section 113 by allows 115 when the worker depresses a button ROUTE 116.

Figure 10:
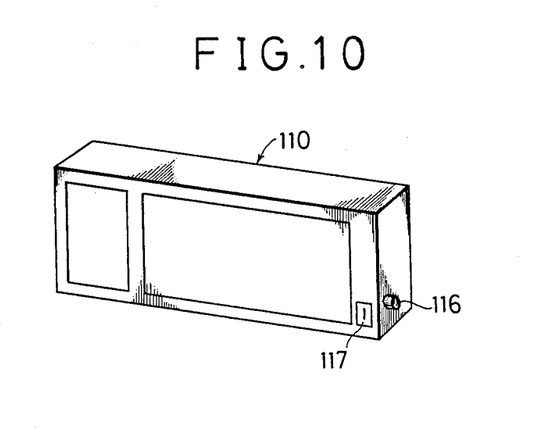
FIG. 10 is a perspective view showing other modification of the selector button and the job/operator indicator of the guide terminal unit according to the present invention.

FIG. 10 shows another modification of the guide terminal unit 110, in which a knob 116 is provided instead of the selector button 111 shown in FIG. 7 and a job/operator number lamp 117 is provided in stead of the lamps 112 also shown in FIG. 7.

Figure 11:
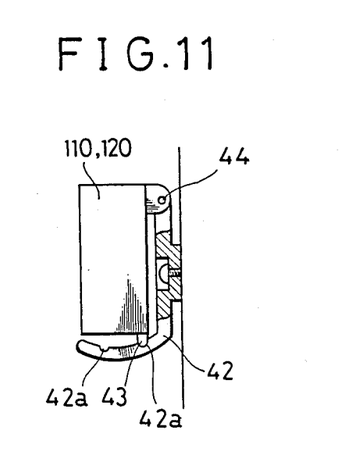
FIG. 11 is a side view of a terminal unit fixing means applicable to the terminal units according to the present invention.

By the way, since the above-mentioned guide and parts terminals devices 110, 120 are fixed to parts boxes placed at a high shelf position or at a low shelf position it is necessary to fix the terminal units to the parts box so that the panel thereof can be adjustably fitted at an angle. FIG. 11 shows an example of an angle-adjustable terminal fixture 44. In this fixture, an L-shaped metal number 42 is fixed to a vertical plate of a parts box, and the device 110, 120 is supported by a plate via a hinge 44. The terminal unit is fixed by engaging a projection 43 attached to the bottom of the device with one of concave notches 42a formed in the L-shaped metal 42.

The operation of the inventory management system according to the present invention will now be described hereinbelow.

(1) Parts storing operation:

Through the keyboard 2 as shown in FIG. 1 which is arranged in the central control unit 10, central operator enters job information such as the name, the quantity, etc. of parts to be stored described in each of inventory job lists. The entered information is recorded in the job file 5. Thereafter, when the operator depresses an output button (not shown), the display sections of all parts terminal units 120 related to the jobs and arranged in parts drawers (boxes) in which the parts should be stored are lit up on the storehouse.

Thereafter, inventory workers are decided for these jobs. The central operator determines the number corresponding to each job or each worker. The workers designated by each of the numbers go into the storehouse to perfom the inventory job.

The operation of a single worker corresponding to operator No. 1 will be described hereinabelow:

The worker 1 starts to move from a work start point along a predetermined route guided by the guide terminal 110 as shown in FIG. 9 together with a bogie. Since guide terminal unit 110 as shown in FIG. 7 is attached to each shelf, it is possible to know only the shelves at which his inventory jobs are necessary, so that the worker can start his jobs immediately without looking for shelves related to his jobs.

While going round in the storehouse, the worker pays attention to the job/operator number display section 124 of the terminal unit 120 arranged at each parts box to find out a lit-up lamp corresponding to his number. When having found the parts terminal unit in which his own lamp is on, he confirms his job (parts storage job) in dependence upon the job display section 125. The worker depresses the selector button 128 so that the number corresponding to his own starts to blink when a plurality of job/operator number lamps 124 are on. Further, in this case, the job display section 125 also comes on when one of the job number lamp 124 starts to blink.

When one of the job displays 125 comes on the quantity of parts to be stored is displayed in the quantity display section 122. In accordance with this quantity indication, the worker stores the corresponding parts mounted on the bogie into the parts box. When the number of parts to be stored is different from that displayed in the quantity display section 121, the worker changes the displayed quantity by depressing the correct buttons 127A and 127B so that the number of parts actually stored matches the quantity actually displayed. After the above work has been completed, the worker lastly depresses the end button 129 to update the parts quantity recorded in the master file 4 of the central control unit 10, by adding the quantity corrected and displayed on the display section 122 to the data recorded in the master file 4.

The worker 1 repeats the same work going round along a predetermined route. The other workers performs the same work simultaneously. When all the jobs have been completed by plural workers in the same shelf, since all the buttons 125 shown in FIG. 6 are depressed by the workers at the terminal unit, it is possible to turn off a pilot lamp mounted on the shelf.

(2) Parts collecting work:

The operation of a single worker corresponding to the operator No. 2 will be described hereinbelow. The worker starts to move from a work start point along a predetermined route guided by the guide terminal 110 as shown in FIG. 9 together with a bogie.

While going round in the storehouse, the worker pays attention to the job/operator number display section 124 of the terminal unit 120 arranged in each parts box to find out a lit-up lamp corresponding to his number No. 2. When having found the terminal unit in which his own lamp is on, he confirms the job (parts collecting work) in dependence upon the job display section 125. The worker depresses the selector button 128 so that the number corresponding to his own starts to blink when a plurality of job/operator number lamps 124 are on. When one of the job displays comes on, the quantity of parts to be collected is displayed in the quantity display section 122. After the above work has been completed, the worker lastly depresses the end button 129 to subtract the displayed parts quantity from the master file 4 of the central control unit 10.

The worker 2 repeats the same work going along the predetermined route. The other workders conduct the same work simultaneously.

(3) Stocktaking operation

The quantities of parts recorded in the master file 4 are all indicated on the parts quantity display sections 122 of all the parts terminal units 120. When workers find out a difference between the displayed parts quantity and the actually stored parts quantity, he corrects the quantity by use of the correct buttons 127A, 127B. Thereafter, when he depresses the end button 129, the quantity displayed on the displayed section 122 is recorded in the master file 4 as an updated data.

Further, where a single worker performs a plurality of jobs, he depresses the selector button 128 to select a job number lamp 124 corresponding to the succeeding job. When selected, the lamp begins to blink, and simultaneously the parts quantity to be next stored or collected is displayed in the display section 122 for the succeeding job.

The inventory management system according to the present invention has the following features:

(1) Slips are unnecessary and the inventory job can be done efficiently because the workers can work in accordance with the guidance of the guide terminal units.

(2) It is possible to directly enter parts information data into the central control unit from the actual parts storage spots without use of slips.

(3) Stocktaking can be performed simply.

Further, without being limited to the above embodiments, the inventory management system according to the present invention can be modified. For instance, an independent power supply such as a solar battery can be mounted on each of the terminal units, without connecting a power supply of the central control unit to each of the terminal units. In this case, it is preferable to transfer information between the central control unit and the terminal units through light, radio waves, etc.

As described, in the system according to the present invention, an inventory control system comprises a central control unit and a plurality of terminal units having a display section for indicating job information on the basis of information entered through the central control unit and an update section for updating inventory information by correcting the parts information displayed on the display section. Further, since each terminal unit is provided for each parts box, it is possible to provide an inventory management system by which workers of a poor experience can perform an accurate and quick inventory work.

What is claimed is:

1. An inventory management system comprising:
   (a) a central control unit having:
      (1) master file means for recording parts inventory information, and
      (2) job file means for recording inventory job information; and
   (b) a plurality of terminal unit means provided for each of a plurality of parts storing containers, including:

(1) job information display means for displaying said inventory job information related to parts stored in each container on the basis of said inventory job information recorded in said job file means; and (2) parts inventory information updating means for updating parts inventory information recorded in said master file means.

2. The inventory management system as set forth in claim 1, wherein said parts inventory information is a name or code and a quantity now in stock being classified according to each of various parts.

3. The inventory management system as set forth in claim 1, wherein said inventory job information includes parts storing jobs, parts collecting jobs, parts stocktaking jobs and a quantity of pairs to be stored, collected or checked according to the inventory job.

4. The inventory management system as set forth in claim 1, wherein said job information displaying means includes:

(a) means for indicating a parts storing job, parts collecting job, and parts stocktaking job;

(b) means for indicating a quantity of parts to be stored, collected or checked according to the indicated job.

5. The inventory management system as set forth in claim 4, wherein said parts job indicating means are three lamps representative of storage, collect and stocktaking, each of these lamps being lit up in response to a command from said central control unit.

6. The inventory management system as set forth in claim 4, wherein said parts quantity indicating means is a digital display unit representative of a parts quantity associated with an indicated job in response to a command from said central control unit.

7. The inventory management system as set forth in claim 4, wherein said job information displaying means further includes:

(a) a job/operator number indicator for indicating the number of jobs or operators when a plurality of jobs are performed simultaneously or when a plurality of operators engage with inventory jobs simultaneously; and (b) a selector button for selecting any one, of the jobs or operators.

8. The inventory management system as set forth in claim 4, wherein said job information displaying means further includes a sub-section displaying means for indicating the number of subsections partitioned within a parts storing container.

9. The inventory management system as set forth in claim 4, wherein said job information displaying means further includes:

(a) an order lamp for indicating that parts have already been ordered;

(b) an other place lamp for indicating that parts in stock at another place;

(c) a short stock lamp for indicating that parts are below a predetermined number; and (d) a non-stock lamp for indicating that parts are not yet stored.

10. The inventory management system as set forth in claim 1, wherein said parts inventory information updating means includes:

(a) means for correcting a parts quantity displayed on said job information displaying means on the basis of actual inventory job, and (b) means for updating a parts quantity recorded in said master file on the basis of a corrected parts quantity displayed on said job information displaying means.

11. The inventory management system as set forth in claim 10, wherein said parts quantity correcting means includes:

(a) digit position shifting button for shifting a position of digits indicative of a parts quantity;

(b) a digit changing button for incrementing or decrementing a digit at the shifted digit position.

12. The inventory management system as set forth in claim 10, wherein said quantity updating means is an end button depressed whenever each inventory job has been completed at each parts storing container.

13. The inventory management system as set forth in claim 10, wherein said parts inventory information updating means further includes an order button for informing said central control unit of an insufficient stock when the number of parts is below a predetermined value.

14. The inventory management system as set forth in claim 10, wherein said parts inventory information updating means further includes a job completion button that is depressed when all jobs related to each parts storing container are completed in order to turn off a lamp mounted on each group of parts storing containers when all jobs related to the group have been completed.

15. The inventory management system as set forth in claim 1 which further includes a plurality of guide terminal unit means in communication with said central control unit and arranged for each group of parts sorting containers to provide an indication of the location of the next job to an inventory worker within a storehouse.

16. The inventory management system as set forth in claim 15, wherein said guide terminal unit means includes:

(a) operator number lamps for indicating one of the numbers representative of workers;

(b) a selector button for selecting the number corresponding to a worker when depressed; and (c) a display unit for indicating all parts container positions in a parts container group related to the worker corresponding to the lamp number.

17. The inventory management system as set forth in claim 16, wherein said guide terminal unit means further includes: sub-section button for displaying sub-section positions of each parts container in sequence.

18. The inventory management system as set forth in claim 17, wherein said guide terminal unit means further includes a route button for indicating a job route for a worker in a storehouse.

19. The inventory management system as set forth in claim 1, wherein said terminal unit means is fixed to each parts container in such a way that an inclination angle thereof is adjustable with fixing means comprising:

(a) an L-shaped supporting members each including at least two concave notch portions;

(b) a convex portion attached to a bottom of said terminal unit means hinged by said supporting member so as to adjustably be engaged with the concave notch portion of said L-shaped supporting member.

* * * * *